May 1, 1956  C. I. BOHLEN  2,743,940
TRAILER FRAME AND FLOOR CONSTRUCTION
Filed Aug. 19, 1952  3 Sheets-Sheet 1

INVENTOR.
CHARLES I. BOHLEN
BY
Caesar and Rivise
ATTORNEYS.

May 1, 1956 C. I. BOHLEN 2,743,940
TRAILER FRAME AND FLOOR CONSTRUCTION
Filed Aug. 19, 1952 3 Sheets-Sheet 2

INVENTOR.
CHARLES I. BOHLEN
BY Caesar and Rivise
ATTORNEYS.

INVENTOR.
CHARLES I. BOHLEN
BY
Caesar and Rivise
ATTORNEYS.

United States Patent Office 2,743,940
Patented May 1, 1956

2,743,940

TRAILER FRAME AND FLOOR CONSTRUCTION

Charles I. Bohlen, Doylestown, Pa., assignor, by mesne assignments, to Fruehauf Trailer Company, Detroit, Mich., a corporation of Michigan Application August 19, 1952, Serial No. 305,161

1 Claim. (Cl. 280—106)

This invention relates to a frame and floor construction in general, but more particularly designed and adapted for use with truck trailers.

The primary object of this invention is to provide a simplified frame and floor construction for trailers which accomplishes a considerable savings in weight of materials but which increases the effective strength of the same.

Heretofore, trailer frames have been constructed of a plurality of longitudinally extending heavy eye beams and fairly heavy outer U-shaped rails connected to the eye beams by a plurality of longitudinally spaced, transversely extending cross sills upon which a flooring is supported.

It is an important object of this invention to simplify the above construction by eliminating entirely the cross sills and the relatively heavy outer rails. This is accomplished by providing a pair of longitudinal outer rails on both sides of the main beams, the outer rails being made of a material which is structurally weaker or lighter than the main beams. By eliminating the cross sills, a single deck floor can be mounted directly on the main beams, the lighter outer rails also serving to support the longitudinal free edge portions of the single deck floor.

The present outer rails not only serve to support the longitudinal free edge portions of the single deck floor, but are of such shape as to transmit side thrusts on the outer rails both to the floor and the main beams. The outer rails are also connected to the eye beams, preferably by angularly disposed braces or trusses which are spaced along the length of the trailer at such distances apart that the stresses in the ralls between the points of support provided by the braces due to a uniformly distributed load on the floor do not exceed the yield point of the material of the rails. These braces or trusses additionally serve to transmit the load on the floor uniformly to the main beams. Hence the present frame is designed for optimum strength to weight ratio.

Another object of this invention is to provide a trailer frame in which the load is carried entirely by the main beams allowing the weight taken out of the super structure to be transferred to the running gear.

Another object of this invention is to provide a more rugged running gear without adding weight to the completed vehicle.

A further object of this invention is to provide a simplified but rugged frame on which a single deck floor may be directly mounted with a minimum of manipulation.

Yet another object of this invention is to provide a trailer frame which is easy to fabricate, requiring no expensive tooling, which is fabricated of standard nonpremium materials and which is an all welded simple construction which is easy to maintain and repair.

Another important object of this invention is to provide a trailer frame in which the upper surface of the main beams adapted to receive the single deck floor is in a single horizontal plane, whereas the height of the main beams at the forward end portion thereof is reduced to carry a king pin for attachment to a prime mover, such as a tractor or truck. Such a construction eliminates the use of outriggers and the conventional drop frame goose neck, both of which are known to be a constant source of trouble.

Other objects and advantages of the invention will appear from the following description and the drawings wherein.

Specific reference will now be made to the drawings wherein similar reference characters will be used for corresponding elements throughout.

Figure 1:
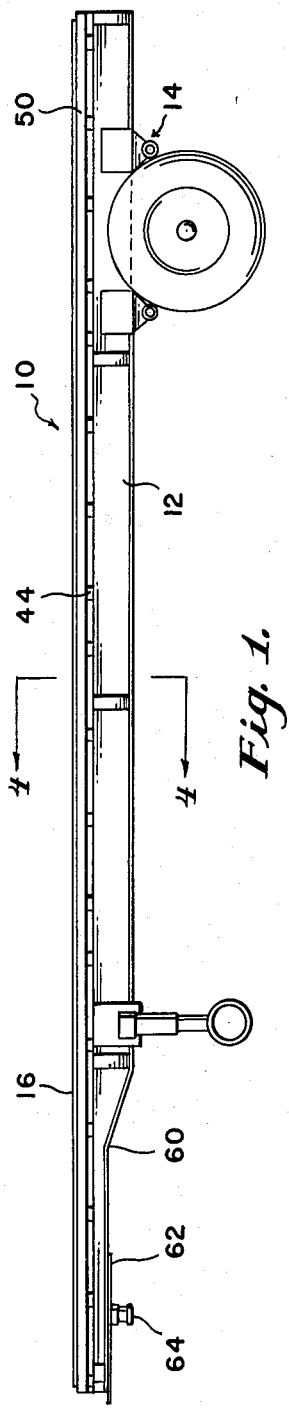
Figure 1 is a side elevational view of the invention.
Figure 2:
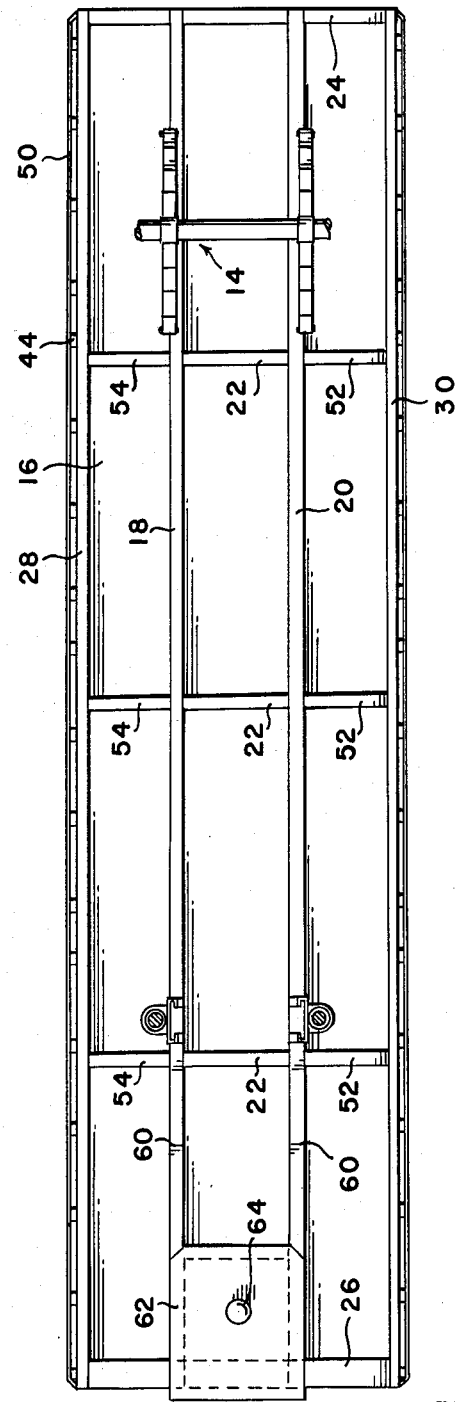
Figure 2 is a bottom plan view of the invention.
Figure 3:
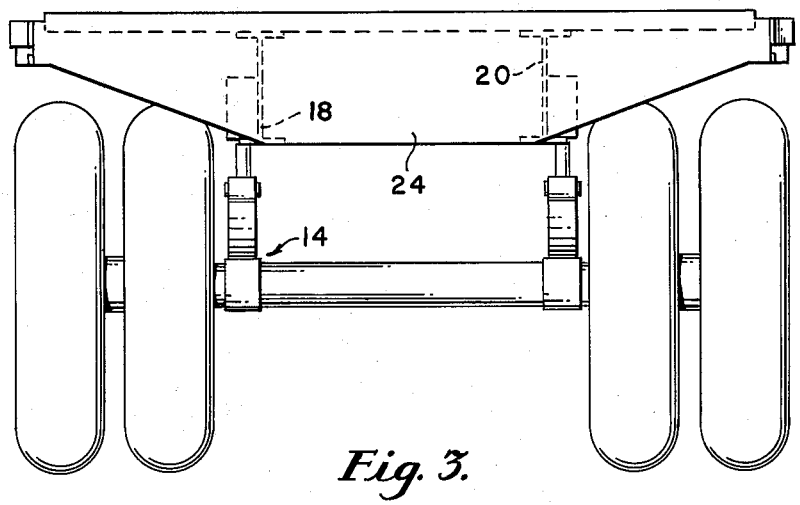
Figure 3 is a rear elevational view of the invention, portions thereof being shown in dotted lines to illustrate details of construction.
Figure 4:
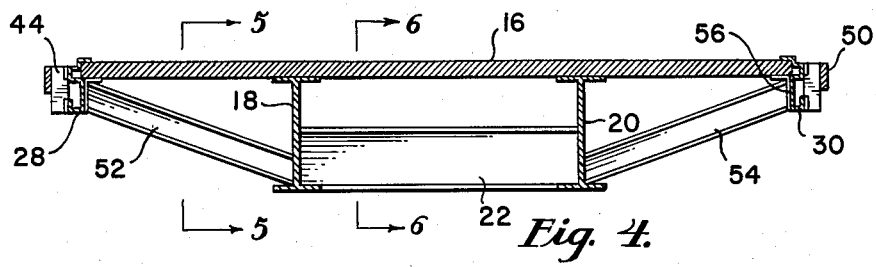
Figure 4 is a sectional view taken substantially on the plane of section line 4—4 of Figure 1.
Figure 5:
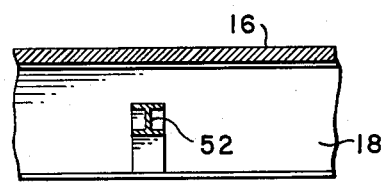
Figure 5 is a sectional view taken substantially on the plane of section line 5—5 of Figure 4.
Figure 6:
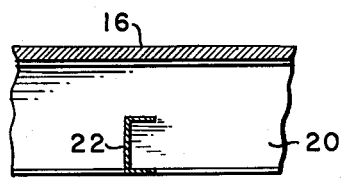
Figure 6 is a sectional view taken substantially on the plane of section line 6—6 of Figure 4.

The invention is generally indicated at 10 and comprises a main frame 12 supported on the running gear 14 and a floor 16 mounted on the main frame.

The main frame includes at least one, but preferably two, longitudinally extending eye beams 18 and 20 which are maintained in a spaced parallel relation by means of longitudinally spaced U-shaped cross members or separators 22. End plates 24 and 26 are welded to the free ends of the eye beams 18 and 20 to give a unitary welded construction.

Spaced from both sides of the eye beams are two longitudinal extending outer rails 28 and 30 which are welded at their free ends to the end plate 24 and 26. The design and construction of these outer rails will be discussed more fully hereinafter.

The floor 16, in the present invention, is of single deck construction and is mounted and secured upon the main frame directly without employing the numerous longitudinally spaced, transversely extending cross sills conventionally used at the present time. The free longitudinal edge portions of the floor are supported in the outer rails 28 and 30 and the central portions of the floor are directly secured to the eye beams 18 and 20, the top surfaces of which lie in a single horizontal plane. The floor may be of wooden construction consisting of a series of interconnected slats, in which case the slats are directly bolted to the eye beams and to the outer rails.

The floor, however, may be of metal construction consisting of a one piece unit of a series of metal interconnected slats, in which case the metal floor is welded to the outer rails and to the upper surface of the eye beams. Due to the difficulty of welding two pieces of metal of different thicknesses, the floor may be welded to a plurality of clips 32 which are in turn welded as at 34 to the upper flanges of the eye beams 18 and 20.

The outer rails 28 and 30 are of identical construction and each is made of a thinner gauge and lighter weight material than the conventional U-shaped side or outer rails presently employed. In addition, the lower surfaces of the outer rails are spaced above the lower surfaces of the eye beams 18 and 20.

Figure 7:
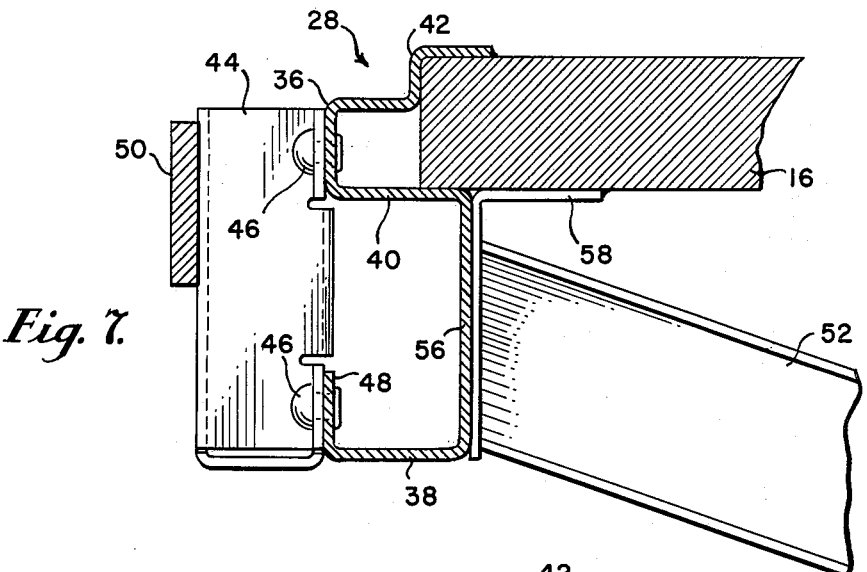
Figure 7 is a fragmentary enlarged vertical sectional view through the floor, outer rail and rub rail and illustrating the details of the shape of the outer rail and its positioning on the frame.
Figure 8:
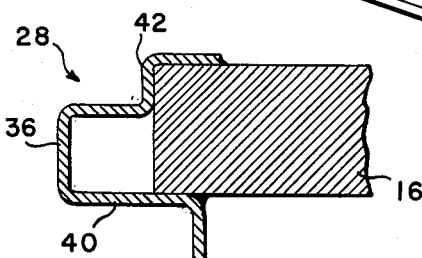
Figure 8 is a fragmentary enlarged vertical sectional view through the floor and the outer rail.
Figure 9:
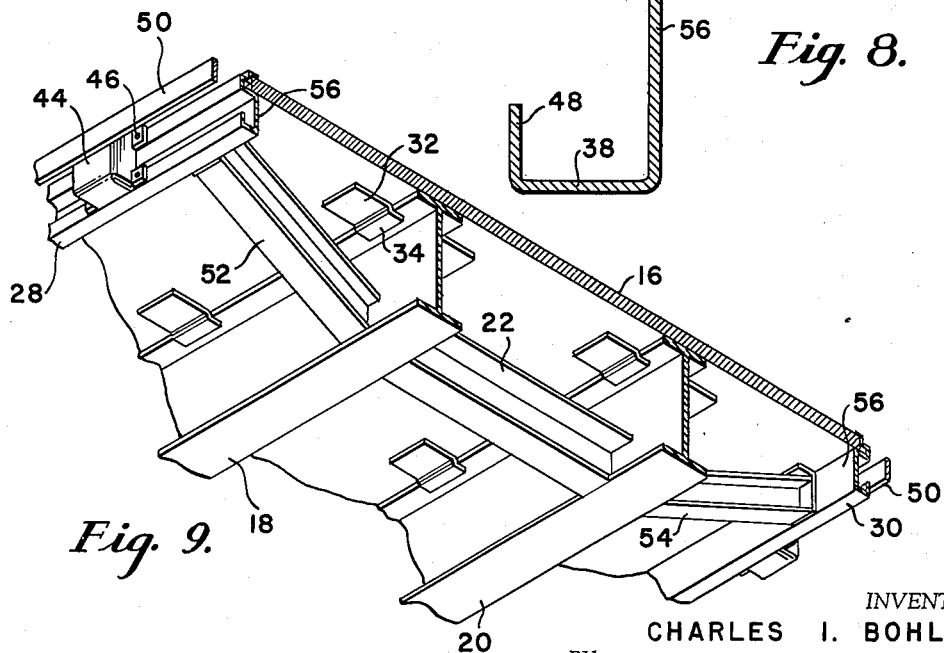
Figure 9 is a fragmentary enlarged perspective view of the invention, parts being shown in sections to disclose details of construction.

As shown more clearly in Figures 7 and 8, each outer rail consists of two oppositely opening, generally U-shaped channels 36 and 38 which are integrally connected by a common leg 40. The upper channels 36 receive the longitudinal free end portions of the floor with a portion of the common leg 40 serving as a bearing or supporting surface for the floor. The floor may be secured in the upper channels by appropriate welding or any other equivalent securing means. The upper channels are also provided with a shoulder 42 providing a bearing surface against the longitudinal free edges of the floor.

The conventional U-shaped, longitudinally spaced stake pockets 44 are appropriately bolted, riveted or welded as at 46 to the web portion of the upper channels 36 and to an upturned lip 48 of the lower channels 38. The conventional longitudinally extending rub rails 50 are welded or otherwise secured to the outer surfaces of the stake pockets 44.

A means is provided for transmitting a load on the floor uniformly to the main beams 18 and 20. This means comprises pairs of longitudinally spaced braces or trusses 52 and 54 which are angularly or diagonally disposed and terminally secured, as by welding, to each of the main beams 18 and 20 and the web portions 56 of the outer rails 28 and 30. Where a metal floor is used, a right angle metallic clip 58 may be welded to the bottom of the floor and the outer surface of the web portion 56 of each outer rail 28 and 30 and in turn welded to the terminal portions of the braces or trusses 52 and 54 as shown more clearly in Figure 7.

It is to be noted that the braces or trusses 54 and 52 and the cross members or separators 22 of the main frame are all generally located in a vertical plane perpendicular to the horizontal plane of the floor. Relatively few angularly disposed trusses 52 and 54 and cross members or separators 22 are used and these are spaced along the length of the trailer at such distances apart that the stresses in the outer rails 28 and 30 due to a uniformly distributed load on the floor do not exceed the yield point of the material of which the outer rails are made.

Thus it will be seen that the load on the floor will not only be resolved into components that will transmit the load to the main eye beams 18 and 20, but also side thrusts or impacts on the rub rail 50 will, because of the special configurations of the outer rails 28 and 30, be transmitted directly to the floor instead of to the main beams.

The present invention includes a feature of construction in design which entirely eliminates the goose neck and the outriggers and the disadvantages resulting therefrom. This is accomplished by keeping the upper surfaces of the main beams 18 and 20 in a single horizontal plane throughout the entire length of the trailer and by undercutting or reducing as at 60 the forward lower ends of the main beams 18 and 20. A plate 62 is welded to the reduced forward portion of the main beam and carries a king pin 64 adapted to be attached to any prime mover.

Thus it will be seen that a floor construction for a trailer is provided which includes a frame of simplified construction that completely eliminates the conventional heavy outer rails and the many transverse cross sills so that a single deck floor can be directly secured to the main frame. The construction is such that light weight outer rails are employed which will distribute a load on the floor uniformly to the main beams by means of relatively few, longitudinally spaced angularly disposed trusses, the outer rails being of such design and configuration as to transmit all side thrusts or impacts directly to the floor. A construction results which saves a considerable amount of weight and still maintains the effective strength of the frame.

While a preferred embodiment of the invention has been shown and described hereinabove, it will be understood that minor variations may be made in the construction and arrangement of parts without departing from the spirit of the invention and the scope of the appended claim.

I claim:

A floor construction for a trailer comprising a main frame including a pair of spaced, parallel longitudinally extending beams, a pair of longitudinally extending outer rails spaced from both sides of said beams, each of said outer rails including an upper channel opening in the direction of said beams, a lower channel opening in a direction opposite to that of the upper channel, a common leg between said channels and a shoulder in said upper channel, pairs of angularly disposed trusses terminally secured to said beams and to the web portions of the lower channels of said outer rails, and a single deck flooring supported on said beams and in the upper channels of said outer rails with the free longitudinal edges of said flooring bearing against the shoulder in the upper channel, said outer rails being lighter and structurally weaker than said beams, and said trusses being spaced along the length of the trailer at such distances apart that the stresses in said outer rails due to a uniformly distributed load on the floor do not exceed the yield point of the material of said outer rails.

References Cited in the file of this patent

UNITED STATES PATENTS

| Number | Name | Date |
| --- | --- | --- |
| 780,317 | Bettendorf | Jan. 17, 1905 |
| 1,230,183 | Lindstrom | June 19, 1917 |
| 1,402,146 | Davis | Jan. 3, 1922 |
| 1,954,637 | Linn | Apr. 10, 1934 |
| 2,172,571 | Theriault | Sept. 12, 1939 |
| 2,222,335 | Dietrich | Nov. 19, 1940 |
| 2,322,841 | Foster | June 29, 1943 |

FOREIGN PATENTS

| 801,367 | Germany | July 8, 1949 |
| --- | --- | --- |
| 296,445 | Great Britain | Nov. 15, 1928 |